Patented July 28, 1953

UNITED STATES PATENT OFFICE 2,647,113

AZO DYESTUFF

Robert Lantz and Georges Mingasson, Paris, France, assignors to Compagnie Francaise des Matieres Colorantes, Saint-Denis, France, a corporation of France No Drawing. Application April 4, 1951, Serial No. 219,317. In France August 24, 1945

Section 1, Public Law 690, August 8, 1946
Patent expires August 24, 1965

3 Claims. (Cl. 260—197)

The present application is a continuation-in-part of our patent application Serial Number 741,420, filed April 14, 1947.

Our invention relates to metallizable azo-dyestuffs.

One object of our invention is to provide azo-dyestuffs which are soluble in sodium sulfide and are of great importance for dyeing cellulosic fibres.

Another object of the invention is to provide metallizable azo-dyestuffs which, after being applied on cellulosic fibres, in a sulfide bath are capable of acquiring remarkable fastnesses when treated with combinations of heavy metals such as copper.

According to our invention a benzenic ortho-aminophenol substituted on the benzenic nucleus by a mercapto group is diazotized and the so obtained diazo-compound is coupled with a coupling component containing an hydroxy group, coupling in a position adjacent that of said hydroxy group, the coupling component and the diazo-compound having no solubilizing groups other than hydroxy groups.

The so obtained azo-dyestuffs have the following general formula:

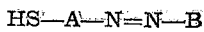

in which A represents a benzenic nucleus substituted by a hydroxy group in ortho position with respect to the azo-group, and B is the radical of a coupling component containing an hydroxy group, coupling in a position adjacent that of said hydroxy group, A and B containing no solubilizing groups other than hydroxy groups.

The benzenic nucleus represented by A may contain other substituents beside the —OH and —SH groups, except, however, as above stated; it must not contain groups which confer solubility in water, nor groups which may be reduced in the dyeing sodium sulfide bath; permissible substituents comprise, more particularly, alkyl groups and halogen atoms.

The diazotization and coupling are carried out in the usual manner. It is sometimes of advantage to accelerate the coupling reaction by adding a solvent such as pyridin.

When using the current coupling compounds it is possible to obtain a very extended range of hues with the same diazo. Thus, with amino-4-hydroxy-3-thiophenol or with one of the derivatives of said compound, chlorinated in positions 6 or 2—6, colours are obtained such as yellow, garnet red, black, etc.

The ortho-aminophenols the benzenic nucleus of which is substituted by a mercapto group which may be used for carrying out the present invention are, for example, amino-4-hydroxy-3-thiophenol, amino-3-hydroxy-4-thiophenol, chloro-6-amino-4-hydroxy-3-thiophenol, dichloro-2,6-amino-4-hydroxy-3-thiophenol and amino-4-hydroxy-3-methyl-2-thiophenol.

Said ortho-aminophenols are new compounds. They may be obtained, for example, by treating chloro-nitrophenols in which the chlorine atom is in para position and the hydroxy group in ortho position with respect to the nitro group with a soluble salt of hydrosulfuric acid or by reducing ortho-nitrophenols substitued by a sulfochloride group.

The dyestuffs prepared according to our invention are soluble in sodium sulfide and the so obtained solutions are capable of dyeing cellulosic fibres; the resulting dyeings acquire remarkable fastnesses when the dyed cellulosic fibres are treated with compounds of heavy metals such as copper, for example.

The following are non limitative examples illustrating our invention. In said examples, the parts are parts by weight, except where otherwise indicated.

Example 1

40 parts sodium salt of chloro-3-nitro-6-phenol are heated for a period of 7 hours so that the condensed liquid flows back, with 400 parts water and 125 parts crystallized sodium sulfide. The solution, red-brown at first, takes on a slight greenish-brown hue. After cooling, a carbon dioxide flow is caused to pass through the solution and 5 parts sodium acetate are added, as well as hydrochloric acid until the solution becomes acid towards litmus.

A light yellow amino-4-hydroxy-3-thiophenol precipitate is obtained, which is soluble in acids and alkalies and alters rather readily in the presence of air.

Example 2

A mixture of 40 parts dichloro-3-4-nitro-6-phenol, 33 parts of 30% soda lye, 116 parts of crystallized sodium sulfide and 600 parts of water are boiled for 7 hours in an apparatus provided with a reflux cooling device. After cooling, 10 parts sodium acetate are added and then hydrochloric acid until the solution becomes acid to litmus. The resulting precipitate is filtered, washed with water and re-dissolved in dilute hydrochloric acid; after filtration, the solution is again precipitated by means of an addition of sodium acetate. The properties of the resulting chloro-6-amino-4-hydroxy-3-thiophenol are similar to those of the substance prepared according to Example 1.

The starting substance, which has a melting point of 82—82.5° C, is prepared by causing dilute soda to act upon trichloro-3-4-5-dinitro-1-2-benzene.

Example 3

8 parts of trichloro-2-3-4-nitro-6-phenol are dissolved in 200 parts of water and 4.5 parts of 30% soda lye. After adding 8 parts of crystallized sodium sulfide, the solution is boiled for a few minutes. Dichloro-2-6-nitro-4-hydroxy-3-thiophenol is then precipitated by means of an addition of hydrochloric acid. The resulting compound, recrystallized from alcohol, melts at 103° C. 12 parts of said compound are dissolved in 200 parts of water and 14 parts of 35% soda lye, and sodium hydrosulfite is then added at low temperature, while stirring, until the solution is discoloured, while maintaining the alkaline pH of the medium. By addition of acetic acid, dichloro - 2 - 6 - amino - 4 - hydroxy - 3 - thiophenol precipitates, which can be recrystallized from methyl alcohol.

Example 4

11 parts of amino-4-hydroxy-3-thiophenol obtained according to the method described in Example 1 are dissolved in 17 parts of 31% hydrochloric acid and 250 parts of water. The obtained solution is cooled down to 5° C. and is added to a solution of 3.5 parts of sodium nitrite in 30 parts of water. The resulting liquid, which contains an orange-brown precipitate of diazo-compound, is poured into a solution containing 7.2 parts of beta-naphthol, 200 parts of water and 12 parts of 35% soda lye. When the coupling is ended, the solution is neutralized with hydrochloric acid and a dyestuff precipitates. Said dyestuff is filtered, washed and dried. It forms a bluish-black powder, yielding at room temperature a blue solution in a sodium sulfide solution. The addition of 50 parts of pyridine to the beta-naphthol solution considerably speeds up the coupling.

Example 5

The amino-4-hydroxy-3-thiophenol obtained, as stated in Example 1, from 195 parts of the sodium salt of chloro-3-nitro-6-phenol is impasted in 640 parts of water and dissolved by addition of 1150 parts of 20° Bé. hydrochloric acid. The obtained solution is cooled down to 5° C. and is diazotized by addition of a 4.5 N sodium nitrite solution. The obtained diazo suspension is poured into a solution containing 150 parts of phenyl-1-methyl-3-pyrazolone-5, 1200 parts of water, 105 parts of 40° Bé. soda lye and 91 parts of sodium carbonate. A dyestuff precipitates, which is filtered, washed and dried. The characteristics of said dyestuff are given in Table I at the end of the present specification.

Example 6

A quantity of moist dichloro-2,6-amino-4-hydroxy-3-thiophenol requiring 5.4 parts of sodium nitrite for diazotization is dissolved in 100 parts of water and 17 parts of 20° Bé. hydrochloric acid, and diazotized with the above mentioned quantity of sodium nitrite in 20% solution. The obtained suspension of diazo-compound is poured into a solution containing 11 parts of hydroxy-2-naphthalene and 20 parts of 38° Bé. soda lye. An insoluble dyestuff precipitates, which is filtered. The characteristics of said dyestuff are given in Table III at the end of the present specification.

The dichloro - 2,6 - amino - 4 - hydroxy - 3 - thiophenol used in the present example was obtained according to the procedure of Example 3 but without drying or re-crystallization.

Example 7

A quantity of chloro-6-amino-4-hydroxy-3-thiophenol requiring 7 parts of sodium nitrite for diazotization is dissolved in 125 parts of water and 25 parts of 20° Bé. hydrochloric acid and diazotized with the above mentioned quantity of sodium nitrite in 20% solution. The obtained suspension of diazo-compound is poured into a solution containing 16 parts of hydroxy-2-naphthalene, 14 parts of 38° Bé. soda-lye and 100 parts of water. After an addition of hydrochloric acid the precipitated dyestuff is filtered, washed and dried. Its characteristics are given in Table II at the end of the present specification.

The chloro-6-amino-4-hydroxy-3-thiophenol used for this preparation was obtained according to the procedure of Example 2.

Example 8

A solution of amino-3-hydroxy-4-thiophenol prepared as stated hereinafter is diazotized at a temperature of 0-5° C. with 62.5 parts by volume of a solution containing 280 grams of sodium nitrite per litre. A diazo-compound is precipitated, which is filtered and washed with water.

A quantity of said moist precipitate containing 8.85 parts of dry product is added in portions to a solution containing 8 parts of hydroxy-2-naphthalene, 2.3 parts of sodium hydroxide and 60 parts of water. The whole is then stirred for 3 hours at room temperature and for one hour at 40° C. After a rest of 12 hours, 30 parts by volume of a saturated solution of sodium chloride are added, the temperature is brought to 90° C., and the dyestuff obtained is filtered after cooling and washed with water.

The characteristics of the so obtained dyestuff are given in Table IV at the end of the present specification.

The solution of amino-3-hydroxy-4-thiophenol used is obtained by mixing little by little 95 parts of nitro-3-hydroxy-4-benzene sulfochloride and 150 parts of zinc powder in 440 parts by volume of 22° Bé. hydrochloric acid, without exceeding the temperature of 50° C. The whole is brought to a boil and 50 parts of zinc powder and 30 parts by volume of hydrochloric acid are further added. The obtained liquor is filtered and the filtrate is collected.

Example 9

The quantity of amino-4-hydroxy-3-methyl-2-thiophenol obtained according to the hereinafter given indications is dissolved in 100 parts of water and 11 parts of 20° Bé. hydrochloric acid. To the obtained solution cooled down to 5° C., 27 parts of a 70% solution of sodium nitrite are added. A precipitate of diazo derivative is formed which is filtered and then coupled with a solution containing 5 parts of beta-naphthol, 100 parts of water and 7 parts of 40° Bé. soda lye. After coupling, the precipitation of the dyestuff is completed by addition of sodium bicarbonate.

The characteristics of said dyestuff are given in Table V at the end of the present specification.

The amino-4-hydroxy-3-methyl-2-thiophenol used for the above preparation is obtained in the following manner: chloro-2-dinitro-5-6-methyl-benzene is hydrolyzed by means of sodium hydroxide and 10 parts of the obtained sodium salt of nitro - 4 - hydroxy - 3 - methyl - 2 - chloro-benzene are heated under reflux for 6 hours with 45 parts by volume of a solution of sodium disulfide containing 18 parts of crystallized sulfide and 2.4 parts of sulfur. After cooling, 2 parts of sodium acetate are added to the solution and hydrochloric acid is added till the reaction is acid to litmus paper. A yellow-brown precipitate of amino-4-hydroxy-3-methyl-2-thiophenol is separated by filtration.

Example 10

0.5 part of the dyestuff obtained in Example 4 is dissolved in 2.5 parts of an aqueous solution containing 1 part of crystallized sodium sulfide and the resulting solution is poured into a solution of 15 parts of crystallized sodium sulfate and 150 parts of water. 10 parts of cotton yarn are dyed for one hour at room temperature in the thus obtained mixture and are then rinsed. The fibre is dyed a marine blue turning to red under the action of acids.

Fibres or objects made of natural or regenerated cellulose such as, for instance, rayon silk fibres or cellophane, are dyed in the same manner, by using the same dyestuff or other dyestuffs prepared according to the invention.

Example 11

The fibres dyed according to the preceding examples are immersed for one quarter of an hour, at room temperature, in a bath of 150 parts of water containing 0.2 part of copper sulfate and, either 0.3 part of acetic acid, a sufficient amount of ammonium hydroxide for obtaining a homogeneous solution, or 0.25 part tartaric acid and the necessary amount of sodium hydroxide for neutralizing the solution. A purple hue is obtained having excellent fastnesses, more particularly to washing and to light.

The same method may be applied to other objects made of cellulose or to other dyestuffs prepared according to the invention.

The following Tables I, II and III give the characteristics of dyestuffs obtained when starting from diazotized amino-4-hydroxy-3-thiophenol, chloro-6-amino-4-hydroxy-3-thiophenol and dichloro-2.6-amino-4-hydroxy-3-thiophenol respectively, and coupling said compounds with various coupling compounds. Tables IV and V give the characteristics of the dyestuffs obtained according to the above Examples 8 and 9 respectively.

TABLE I

| Amino-4-hydroxy-3-thiophenol with— | Solution in concentrated sulfuric acid | Solution in sodium sulfide | Direct dyeing on cotton | Coppered dyeing on cotton |
|---|---|---|---|---|
| Hydroxy-2-napthalene | bluish-purple | purple | blue | purple. |
| Acetylacetanilide | reddish-brown | reddish-yellow | reddish-yellow | brown-yellow. |
| Acetylacetometaxylidide | do | do | do | Do. |
| Di(acetylacetamino)-4-.4'-dimethyl-3.3'-diphenyl. | do | red | do | yellow. |
| Phenyl-1-methyl-3-pyrazolone-5 | red | do | red | reddish-brown. |
| Hydroxy-3-phenylamino-benzene | purple | reddish-purple | black-blue | purple-brown. |
| Di-hydroxy-2.6-napthalene | blue | greenish-blue | do | purplish-blue. |
| Di-hydroxy-2.7-napthalene | do | blue | black | purple. |
| Di-hydroxy-1.5-naphthalene | greenish-blue | purple | blue | blue-grey. |
| Di-hydroxy-1.8-napthalene | do | purplish-red | black | black-grey. |
| Hydroxy-5-amino-1-naphthalene (alkaline coupling). | blue | do | do | Do. |

TABLE II

| Chloro-6-amino-4-hydroxy-3-thiophenol with— | Solution in concentrated sulfuric acid | Solution in sodium sulfide | Direct dyeing on cotton | Coppered dyeing on cotton |
|---|---|---|---|---|
| Hydroxy-2-naphthalene | blue | purple | blue | purple. |
| Acetylacetanilide | yellowish-brown | reddish-brown | yellowish-brown | yellowish-brown. |
| Phenyl-1-methyl-3-pyrazolone-5 | brownish-red | do | reddish-brown | reddish-brown. |
| Di (acetylacetamino) 4.4'dimethyl-3.3'-diphenyl. | reddish-brown | do | yellowish-brown | yellow. |
| Hydroxy-3-phenylamino-benzene | purple | reddish-purple | purple-brown | purple brown. |
| Dihydroxy-2.6-naphthalene | blue | blue | blue | purplish-blue. |
| Di-hydroxy-2.7-naphthalene | do | do | do | purple. |
| Di-hydroxy-1.5-naphthalene | greenish-blue | black-purple | do | black-grey. |
| Di-hydroxy-1.8-naphthalene | do | do | do | Do. |
| Hydroxy-5-amino-1-naphthalene (alkaline coupling). | blue | do | do | Do. |

TABLE III

| Dichloro-2.6-amino-4-hydroxy-3-thiophenol with— | Solution in concentrated sulfuric acid | Solution in sodium sulfide | Direct dyeing on cotton | Coppered dyeing on cotton |
|---|---|---|---|---|
| Hydroxy-2-naphthalene | blue | purple | purplish-blue | purple. |
| Hydroxy-2-naphthoyl-3-aminobenzene | do | do | blue | Do. |
| (Hydroxy-2'-naphthoyl-3'-amino) 1-methyl-2-benzene. | do | purple red | purplish-blue | Do. |
| (Hydroxy-2'-naphthoyl-3'-amino) 1-methoxy-2-benzene. | do | do | do | Do. |
| (Hydroxy-2'-naphthoyl-3'-amino) 2-naphthalene. | greyish-blue | do | purple | Do. |
| (Hydroxy-2'-anthraquinoyl-3'-amino) 1-methyl-2-benzene. | greenish-blue | blue | green-blue | green. |
| (Di-acetylacetamino)4.4'-dimethyl-3.3'-diphenyl. | brown-yellow | reddish-brown | orange-red | orange-yellow. |
| Di-hydroxy-1.5-naphthalene | greenish-blue | blue | blue | grey. |
| Di-hydroxy-2.6-naphthalene | blue | do | black-blue | purple. |
| Di-hydroxy-2.7-naphthalene | purplish-blue | purplish-red | blue | Do. |
| Di-hydroxy-1.8-naphthalene | greenish-blue | purple-red | do | brown. |
| Hydroxy-5-amino-1-naphthalene (alkaline coupling). | Black-blue | blue | do | brown-grey. |
| Resorcinol | red | red | purple | bordeaux. |
| Phenyl-1-methyl-3-pyrazolone-5 | brown-red | yellowish-brown | orange-yellow | red brown. |
| Acetylacetanilide | orange | red | red | orange-yellow. |
| Hydroxy-3-phenylamino-benzene | black-blue | do | purplish-brown | brown-purple. |
| Chloro-4-hydroxy-1-naphthalene | blue | purple | black-blue | purplish-blue. |
| Chloro-3-hydroxy-2-naphthalene | do | purplish-red | blue | purple. |

TABLE IV

| Amino-3-hydroxy-4-thiophenol with— | Solution in concentrated sulfuric acid | Solution in sodium sulfide | Direct dyeing on cotton | Coppered dyeing on cotton |
|---|---|---|---|---|
| hydroxy-2-naphthalene. | violet | violet-blue | violet | violet. |

TABLE V

| Amino-4-hydroxy-3-methyl-2-thiophenol with— | Solution in concentrated sulfuric acid | Solution in sodium sulfide | Direct dyeing on cotton | Coppered dyeing on cotton |
|---|---|---|---|---|
| Beta-naphthol | blue | violaceous blue. | violet | violet. |

What we claim is:

1. A metallizable azodyestuff having the following general structural formula:

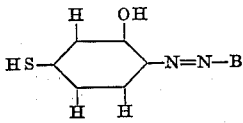

in which B is the radical of a coupling component the coupling position of which is adjacent that of a hydroxyl group and which contains no solubilizing group other than hydroxyl groups.

2. An azodyestuff according to claim 1 in which B is the radical of an hydroxylated derivative of naphthalene.

3. An azodyestuff according to claim 1 in which B is the 2-hydroxy naphthalene radical.

ROBERT LANTZ.
GEORGES MINGASSON.

References Cited in the file of this patent

UNITED STATES PATENTS

| Number | Name | Date |
|---|---|---|
| 1,973,635 | Lantz | Sept. 11, 1934 |
| 2,200,006 | McNally et al. | May 7, 1940 |
| 2,267,639 | Clayton et al. | Dec. 23, 1941 |

FOREIGN PATENTS

| Number | Country | Date |
|---|---|---|
| 713,276 | France | Aug. 11, 1931 |